US 9,195,628 B2

(12) United States Patent
Oestergren et al.

(10) Patent No.: US 9,195,628 B2
(45) Date of Patent: Nov. 24, 2015

(54) PARTITIONED BLUETOOTH SYSTEM

(75) Inventors: Johan Oestergren, Munich (DE); Michael Lewis, London (GB)

(73) Assignee: Intel Deutschland GmbH, Neubiberg (DE)

( * ) Notice: Subject to any disclaimer, the term of this patent is extended or adjusted under 35 U.S.C. 154(b) by 2091 days.

(21) Appl. No.: 12/192,160

(22) Filed: Aug. 15, 2008

(65) Prior Publication Data
US 2010/0041336 A1 Feb. 18, 2010

(51) Int. Cl.
*H04W 84/18* (2009.01)
*G06F 15/163* (2006.01)

(52) U.S. Cl.
CPC ............ *G06F 15/163* (2013.01); *H04W 84/18* (2013.01)

(58) Field of Classification Search
CPC .................................................... H04W 84/18
USPC ......................................................... 455/412
See application file for complete search history.

(56) References Cited

U.S. PATENT DOCUMENTS

| 6,625,150 | B1 * | 9/2003 | Yu .................................. 370/389 |
| 7,075,914 | B2 | 7/2006 | Kwan |
| 7,221,926 | B1 | 5/2007 | Beard |
| 2001/0055281 | A1 * | 12/2001 | Kwan ........................... 370/280 |
| 2002/0065730 | A1 * | 5/2002 | Nii ................................... 705/26 |
| 2004/0153793 | A1 * | 8/2004 | Jarboe et al. .................... 714/27 |
| 2004/0215963 | A1 * | 10/2004 | Kaplan ........................ 713/172 |
| 2006/0258289 | A1 * | 11/2006 | Dua ............................ 455/41.3 |

* cited by examiner

*Primary Examiner* — Lester Kincaid
*Assistant Examiner* — Andy Gu

(57) ABSTRACT

A system includes a first memory, a second memory, a host processor, and a second processor. The first memory is configured to store first layers of a Bluetooth protocol stack including at least a portion of a link manager layer. The second memory is configured to store second layers of the Bluetooth protocol stack. The second layers have higher real-time requirements than the first layers. The host processor is coupled to the first memory. The host processor is configured to execute the first layers. The second processor is coupled to the second memory. The second processor is configured to execute the second layers.

8 Claims, 2 Drawing Sheets

000
PARTITIONED BLUETOOTH SYSTEM

BACKGROUND

Bluetooth wireless technology is a short-range communications technology intended to replace the cables connecting portable and/or fixed devices while maintaining high levels of security. The key features of Bluetooth technology are robustness, low power, and low cost. The Bluetooth specification defines a uniform structure for a wide range of devices to connect and communicate with each other.

Bluetooth solutions are increasingly being adopted for mobile phones and for other consumer electronic products. Bluetooth implementations include a Bluetooth protocol stack including an application layer down to low-level radio link management functions. Typically, a host chip (e.g., a mobile phone baseband chip) executes the portions of the Bluetooth protocol stack near the application layer, and a separate Bluetooth transceiver chip, which contains the Bluetooth radio interface, executes the portions of the Bluetooth protocol stack dealing with link management and control. Communications between the host chip and the Bluetooth transceiver chip are typically performed according to an interface defined as an option in the Bluetooth specification. The Bluetooth specification specifies a logical host controller interface (HCI) for commands and events and a transport layer for the physical transport.

The Bluetooth protocol stack on the Bluetooth transceiver chip typically includes the transport layer, the HCI for commands and events layer, the link manager layer, the link controller layer, and the baseband firmware layer. The Bluetooth protocol stack on the Bluetooth transceiver chip is typically stored in a read-only memory (ROM) of the Bluetooth transceiver chip. A random access memory (RAM) of the Bluetooth transceiver chip typically stores Bluetooth user payload buffers received from the host before they are transmitted over an air link. The RAM also stores payload buffers received over an air link before they are transported to the host over the Bluetooth transport layer. The on-chip RAM and ROM of the Bluetooth transceiver chip are significant contributors to the cost of the system.

For these and other reasons, there is a need for the present invention.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Figure 1:
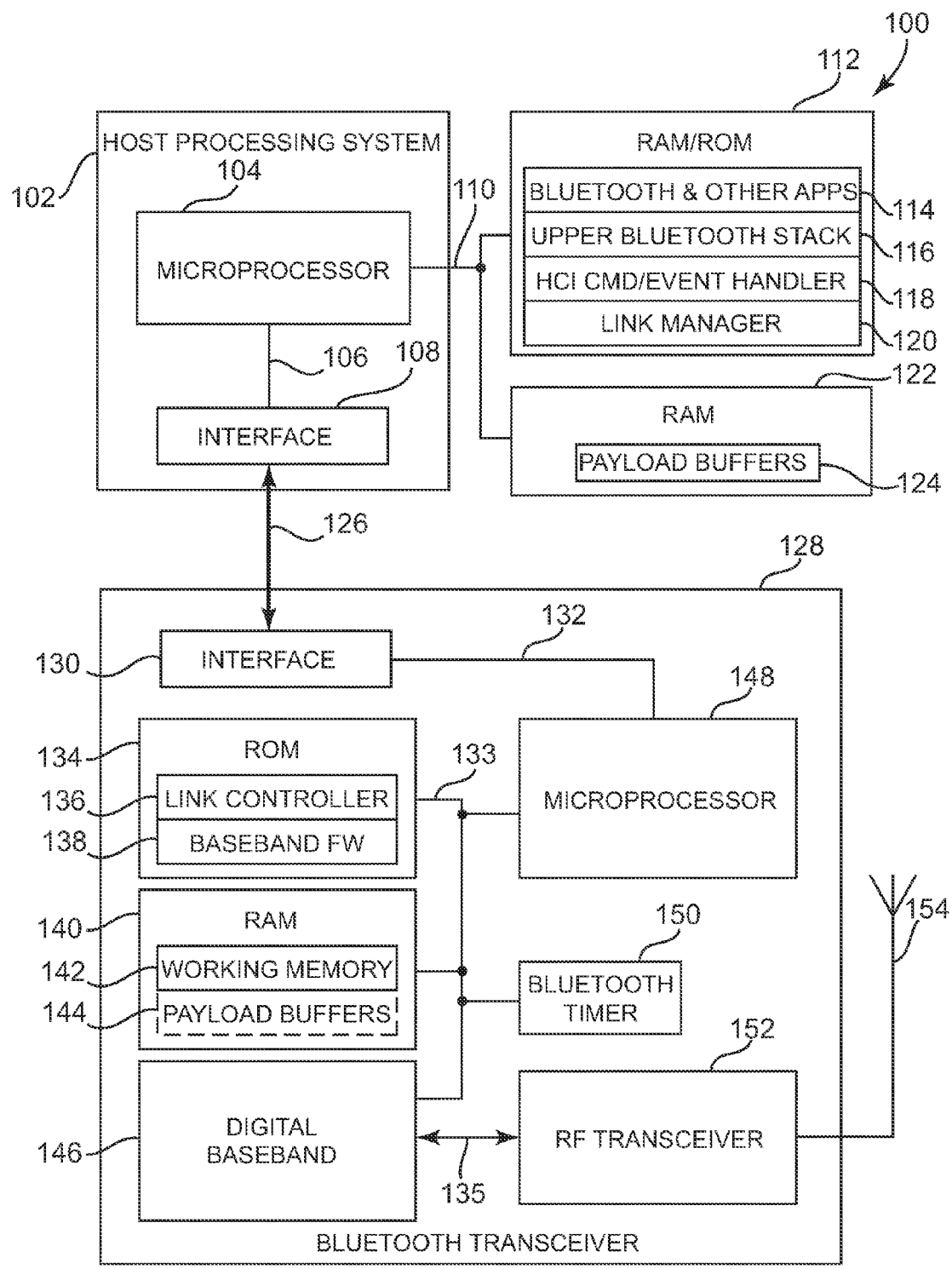
FIG. 1 is a block diagram illustrating one embodiment of a Bluetooth enabled system.

FIG. 1 is a block diagram illustrating one embodiment of a Bluetooth enabled system 100. In one embodiment, Bluetooth enabled system 100 is a part of a mobile phone or other suitable electronic device. Bluetooth enabled system 100 includes a host processing system 102, a random access memory (RAM) or read-only memory (ROM) 112, a RAM 122, and a Bluetooth transceiver 128.

The Bluetooth protocol stack typically executed on a Bluetooth transceiver chip includes firmware with both high real-time requirements and firmware with low real-time requirements. Based on the Bluetooth specification, the real-time requirements of the Bluetooth protocol stack above the link controller layer are significantly lower than the real-time requirements of the link controller layer and below. Bluetooth enabled system 100 partitions the Bluetooth protocol stack such that a larger portion of the Bluetooth protocol stack is executed by host processing system 102 instead of by Bluetooth transceiver 128. By partitioning the Bluetooth protocol stack in this way, on-chip ROM and RAM usage by Bluetooth transceiver 128 can be significantly reduced, thereby reducing the cost of Bluetooth enabled system 100.

Host processing system 102 includes a microprocessor 104 and an interface 108. Microprocessor 104 is communicatively coupled to interface 108 through communication link 106. In one embodiment, host processing system 102 is implemented on the same chip as Bluetooth transceiver 128. Interface 108 of host processing system 102 communicates with Bluetooth transceiver 128 for passing control and data signals between host processing system 102 and Bluetooth transceiver 128.

Microprocessor 104 is communicatively coupled to RAM/ROM 112 and RAM 122 through communication link 110. In one embodiment, RAM/ROM 112 is external to host processing system 102 as a first memory subsystem, and RAM 122 is external to host processing system 102 as a second memory subsystem. In another embodiment, RAM/ROM 112 and RAM 122 are external to host processing system 102 and are combined as a single memory subsystem. In another embodiment, RAM/ROM 112 is external to host processing system 102, and RAM 122 is internal to host processing system 102 and is combined on a single chip with host processing system 102.

In one embodiment, RAM/ROM 112 includes an electrically-erasable and programmable read-only memory (EEPROM), FLASH, or other suitable non-volatile memory. RAM/ROM 112 stores Bluetooth applications and other applications 114, the upper Bluetooth protocol stack 116 (i.e., the logical link control and adaptation protocol (L2CAP) layer, the service discovery protocol (SDP) layer, the radio frequency communication (RFCOMM) layer, and the object exchange (OBEX) layer), at least a portion of the host controller interface (HCI) command and event handler layer 118, and at least a portion of the link manager layer 120. In one embodiment, RAM/ROM 112 stores the entire host controller interface command and event handler layer 118 and the entire link manager layer 120.

Microprocessor 104 of host processing system 102 executes the Bluetooth applications and other applications 114 (e.g., mobile phone applications), the upper Bluetooth protocol stack 116, at least the portion of the host controller interface command and event handler layer 118, and at least the portion of the link manager layer 120. In one embodiment, host processing system 102 executes the entire host controller interface command and event handler layer 118 and the entire link manager layer 120. Host controller interface command and event handler layer 118 manages commands and events between host processing system 102 and Bluetooth transceiver 128. Link manager layer 120 creates, modifies, and releases logical links and updates parameters related to physical links between Bluetooth devices.

In one embodiment, RAM 122 includes a dynamic random access memory (DRAM) or another suitable RAM. RAM 122 stores payload buffers 124 received from the host processing system 102 before they are transmitted to Bluetooth transceiver 128 for transmission over an air link. RAM 122 also stores payload buffers 124 received from Bluetooth transceiver 128 that were received over an air link.

Host processing system 102 is communicatively coupled to Bluetooth transceiver 128. Interface 108 of host processing system 102 is communicatively coupled to an interface 130 of Bluetooth transceiver 128 through communication link 126. In one embodiment, Bluetooth transceiver 128 is a single chip and communication link 126 is an external communication link. In another embodiment, host processing system 102 and Bluetooth transceiver 128 are combined on a single chip and communication link 126 is an internal communication link.

Bluetooth transceiver 128 includes interface 130, an internal ROM 134, an internal RAM 140, a digital baseband circuit 146, a microprocessor 148, a Bluetooth timer 150, a radio frequency (RF) transceiver 152, and a connection to an antenna 154. Interface 130 is communicatively coupled to microprocessor 148 through communication link 132. Microprocessor 148 is communicatively coupled to internal ROM 134, internal RAM 140, digital baseband circuit 146, and Bluetooth timer 150 through communication link 133. Digital baseband circuit 146 is communicatively coupled to radio frequency transceiver 152 through communication link 135.

Interface 130 of Bluetooth transceiver 128 communicates with interface 108 of host processing system 102 for passing control and data signals between Bluetooth transceiver 128 and host processing system 102. Internal ROM 134 stores at least a portion of link controller layer 136 and at least a portion of baseband firmware layer 138 of the Bluetooth protocol stack. In one embodiment, internal ROM 134 stores the entire link controller layer 136 and the entire baseband firmware layer 138.

In one embodiment, microprocessor 148 of Bluetooth transceiver 128 is a dedicated microprocessor for executing Bluetooth operations. Microprocessor 148 executes at least the portion of the link controller layer 136 and at least the portion of the baseband firmware layer 138. In one embodiment, microprocessor 148 executes the entire link controller layer 136 and the entire baseband firmware layer 138. Link controller layer 136 controls the scheduling of the transmission and reception of data packets to and from other Bluetooth devices. Baseband firmware layer 138 controls digital baseband circuit 146. The Bluetooth specified transport layer of the Bluetooth protocol stack is excluded in Bluetooth enabled system 100, since the firmware above and below host controller interface command and event handler layer 118 is executed by microprocessor 104 of host processing system 102.

Internal RAM 140 includes working memory 142 for Bluetooth transceiver 128. In one embodiment, internal RAM 140 also stores Bluetooth user payload buffers 144. In one embodiment, internal RAM 140 stores payload buffers received from host processing system 102 before they are transmitted over an air link and stores payload buffers received over an air link before they are transmitted to host processing system 102. In one embodiment, RAM 122 stores all payload buffers 124 and RAM 140 does not store payload buffers 144. In another embodiment, RAM 122 stores some payload buffers 124 and RAM 120 stores some of payload buffers 144.

Bluetooth timer 150 provides a Bluetooth clock signal that is used to synchronize communications between Bluetooth transceiver 128 and other Bluetooth devices. Digital baseband circuit 146 controls radio frequency transceiver 152 through communication link 135 to transmit and receive data packets over an air link. Radio frequency transceiver 152 transmits and receives data packets over an air link through antenna 154.

Figure 2:
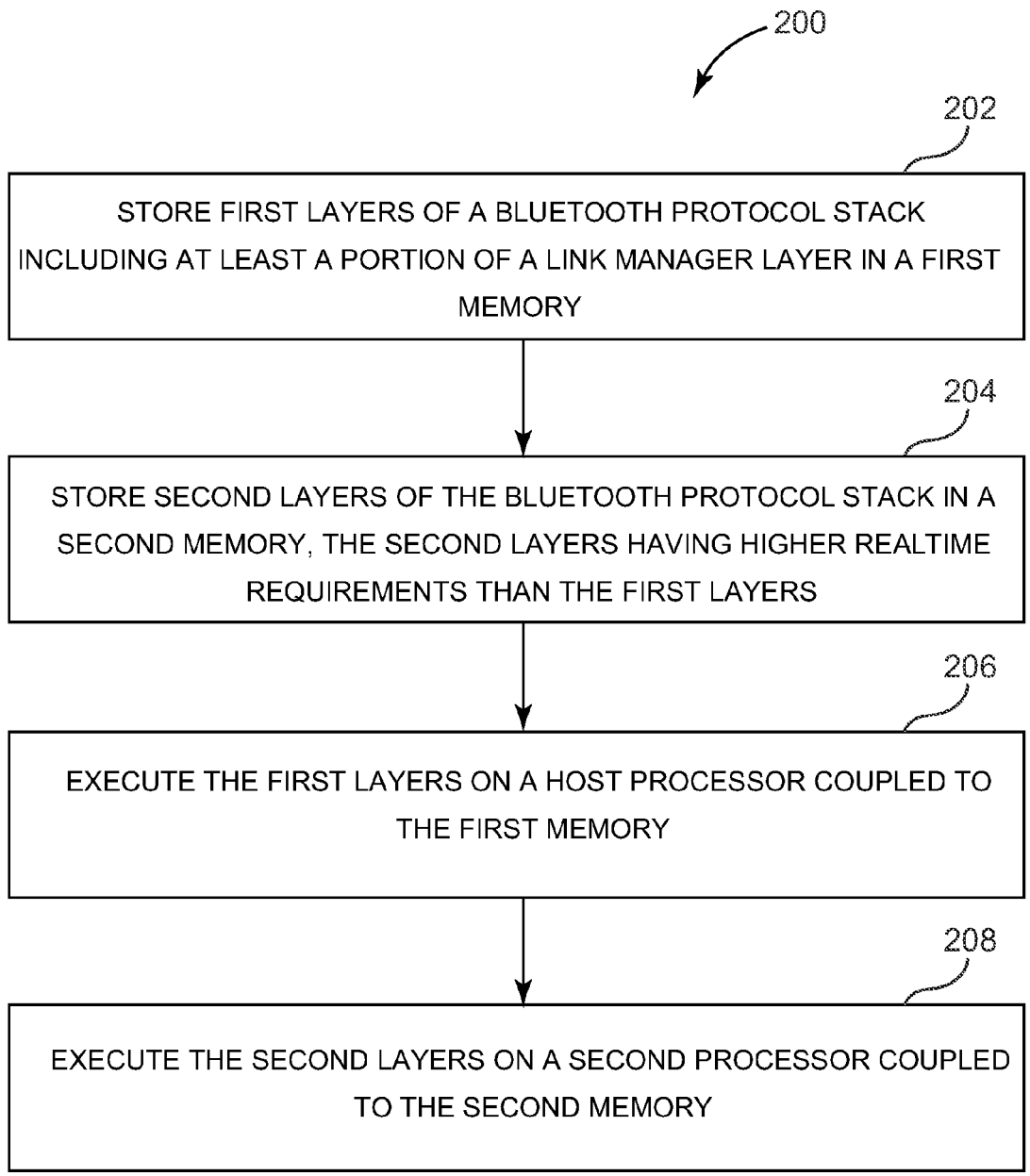
FIG. 2 is a flow diagram illustrating one embodiment of a method for operating a Bluetooth enabled system.

FIG. 2 is a flow diagram illustrating one embodiment of a method 200 for operating a Bluetooth enabled system, such as Bluetooth enabled system 100 previously described and illustrated with reference to FIG. 1. At 202, first layers of a Bluetooth protocol stack including at least a portion of a link manager layer are stored in a first memory. In one embodiment, at least a portion of a host controller interface command and event handler layer of the Bluetooth protocol stack is also stored in the first memory. In another embodiment, the entire link manager layer and/or the entire host controller interface command and event handler layer of the Bluetooth protocol stack are stored in the first memory.

At 204, second layers of the Bluetooth protocol stack are stored in a second memory. The second layers of the Bluetooth protocol stack have higher real-time requirements than the first layers of the Bluetooth protocol stack. In one embodiment, at least a portion of a link controller layer and/or at least a portion of a baseband firmware layer of the Bluetooth protocol stack are stored in the second memory. In another embodiment, the entire link controller layer and/or the entire baseband firmware layer of the Bluetooth protocol stack are stored in the second memory.

At 206, the first layers of the Bluetooth protocol stack, which are stored in the first memory, are executed on a host processor coupled to the first memory. At 208, the second layers of the Bluetooth protocol stack, which are stored in the second memory, are executed on a second processor coupled to the second memory. In one embodiment, payload buffers are stored in a third memory coupled to the host processor and/or in a fourth memory coupled to the second processor.

Embodiments provide a Bluetooth enabled system where the storage and execution of Bluetooth protocol stack layers having low real-time requirements are moved from a Bluetooth transceiver to a host processing system. In one embodiment, the storage of Bluetooth protocol stack layers having low real-time requirements, such as the host controller interface command and event handler layer and the link manager layer, is moved to an external memory of the host processing system. In addition, in one embodiment, the storage of all or some of the payload buffers is moved from an on-chip memory of the Bluetooth transceiver to an external memory of the host processing system. Therefore, less on-chip memory is used on the Bluetooth transceiver.

The external memory of the host processing system is less expensive than the on-chip memory of the Bluetooth transceiver. Thus, by moving the storage and execution of Bluetooth protocol stack layers having low real-time requirements and all or some of the payload buffers to the host processing system, the size of the on-chip memory of the Bluetooth transceiver can be reduced. By reducing the size of the on-chip memory, the cost of the Bluetooth enabled system is reduced compared to typical Bluetooth enabled systems. The cost of the Bluetooth enabled system is reduced without sacrificing performance of the Bluetooth enabled system. By reducing the size of the on-chip memory of the Bluetooth transceiver, the combination of the host processing system and the Bluetooth transceiver onto a single chip is simplified. In addition, by moving the storage and execution of Bluetooth protocol stack layers having only low real-time requirements to the host processing system, performance of the host processing system and its ability to perform other tasks are not significantly adversely affected.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A system comprising:
a first memory configured to store first layers of a Bluetooth protocol stack including at least a portion of a link manager layer;
a second memory configured to store second layers of the Bluetooth protocol stack, the second layers having higher real-time requirements than the first layers;
a host processor coupled to the first memory, the host processor configured to execute the first layers;
and a second processor coupled to the second memory, the second processor configured to execute the second layers, wherein the first memory and the second memory exclude a Bluetooth specified transport layer of the Bluetooth protocol stack.

2. The system of claim 1, wherein the first memory and the host processor are on different chips.

3. The system of claim 1, wherein the second memory and the second processor are on a single chip.

4. The system of claim 1, wherein the second memory, the host processor, and the second processor are on a single chip.

5. The system of claim 1, wherein the first layers comprise at least a portion of a host controller interface command and event handler layer.

6. The system of claim 1, wherein the second layers comprise at least a portion of a link controller layer and at least a portion of a baseband firmware layer.

7. The system of claim 1, further comprising:
a third memory coupled to the host processor, the third memory configured to store payload buffers.

8. The system of claim 7, further comprising:
a fourth memory coupled to the second processor, the fourth memory configured to store payload buffers.

* * * * *